United States Patent [19]

Christe et al.

[11] 4,447,407

[45] May 8, 1984

[54] PERFLUOROAMMONIUM SALTS FLUOROXENON ANIONS

[75] Inventors: Karl O. Christe, Calabasas; William W. Wilson, Simi Valley, both of Calif.

[73] Assignee: The United States of America as represented by the Secretary of the Navy, Washington, D.C.

[21] Appl. No.: 540,951

[22] Filed: Oct. 11, 1983

Related U.S. Application Data

[62] Division of Ser. No. 391,786, Jun. 24, 1983, Pat. No. 4,428,913.

[51] Int. Cl.$^3$ .............................................. C01B 23/00
[52] U.S. Cl. .................................... 423/262; 149/119; 423/351; 423/462; 204/157.1 R; 204/157.1 H
[58] Field of Search ................. 423/262; 204/157.1 R, 204/157.1 H

[56] References Cited

U.S. PATENT DOCUMENTS

4,001,135  1/1977  O'Pray et al. ....................... 149/119

OTHER PUBLICATIONS

Christe et al., "Inorg. Chemistry", vol. 19, 1980, pp. 1494–1498.
Peacock et al., "J. Inorg. and Nucl. Chemistry", vol. 28, 1966, pp. 2561–2567.
Wilson et al., "Inorg. Chemistry", vol. 21, 1982, pp. 2091–2094.

*Primary Examiner*—Herbert T. Carter
*Attorney, Agent, or Firm*—Robert F. Beers; Thomas M. Phillips

[57] ABSTRACT

New energetic salts $NF_4XeF_7$ and $(NF_4)_2XeF_8$ are prepared by reacting $NH_4HF_2$ with $XeF_6$ and exposing $NF_4XeF_7$ to blue 4880 Å laser light.

2 Claims, No Drawings

PERFLUOROAMMONIUM SALTS FLUOROXENON ANIONS

This application is a division of application Ser. No. 391,786, filed June 24, 1983 now U.S. Pat. No. 4,428,913.

BACKGROUND OF THE INVENTION

This invention relates to energetic inorganic salts and more particularly to salts containing the $NF_4^+$ cation.

$NF_4^+$ salts are key ingredients for solid propellant $NF_3$-$F_2$ gas generators, as shown by D. Pilipovich in U.S. Pat. No. 3,963,542, and for high detonation pressure explosives, as shown by K. O. Christe in U.S. Pat. No. 4,207,124. The synthesis of $NF_4^+$ salts is unusually difficult because the parent molecule $NF_5$ does not exist and the salts must be prepared from $NF_3$ which amounts formally to a transfer of $F^+$ to $NF_3$ according to:

$$NF_3 + F^+ \rightarrow NF_4^+$$

Since fluorine is the most electronegative of all elements, $F^+$ cannot be generated by chemical means. This difficult synthetic problem was overcome by K. O. Christe, et al as shown in U.S. Pat. No. 3,503,719. By the use of an activation energy source and a strong volatile Lewis acid, such as $AsF_5$, the conversion of $NF_3$ and $F_2$ to an $NF_4^+$ salt become possible:

$$NF_3 + F_2 + AsF_5 \xrightarrow{\Delta E} NF_4^+ AsF_6^-$$

However, only few Lewis acids are known which possess sufficient strength and acidity to be effective in this reaction. Therefore, other indirect methods were needed which allowed conversion of the readily accessible $NF_4^+$ salts into other new salts. Two such methods are presently known. The first one involves the displacement of a weaker Lewis acid by a stronger Lewis acid, as shown by K. O. Christe and C. J. Schack in U.S. Pat. No. 4,172,881 for the system:

$$NF_4BF_4 + PF_5 \rightarrow NF_4PF_6 + BF_3$$

but is again limited to strong Lewis acids. The second method is based on metathesis, i.e., taking advantage of the different solubilities of $NF_4^+$ salts in solvents such as HF or $BrF_5$. For example, $NF_4SbF_6$ can be converted to $NF_4BF_4$ according to:

$$NF_4SbF_6 + CsBF_4 \xrightarrow[-78^\circ C.]{HF} CsSbF_6\downarrow + NF_4BF_4$$

| soluble | soluble | insoluble | soluble |

This method has successfully been applied by K. O. Christe, et al as shown in U.S. Pat. Nos. 4,108,965; 4,152,406; and 4,172,884 to the synthesis of several new salts. However, this method is limited to salts which have the necessary solubilities and are stable in the required solvent. The limitations of the above two methods are quite obvious and preempted the synthesis of $NF_4^+$ salts of anions which are either insoluble in these solvents or are derived from Lewis acids weaker than the solvent itself and therefore are displaced from their salts by the solvent.

SUMMARY OF THE INVENTION

The limitations of the previously known reactions for the synthesis of $NF_4^+$ salts are overcome by the present invention. It was found that $NF_4^+$ salts derived from very weak and volatile Lewis acids, such as $XeF_6$, which are weaker than the solvent itself, can be prepared by the following method. A solid having the composition $NF_4HF_2 \cdot nHF$, where n ranges from about 0.5 to 10, was obtained as described by K. O. Christe et al in Inorganic Chemistry, 19, 1494 (1980). Repeated treatments of $NF_4HF_2 \cdot nHF$ with a large excess of $XeF_6$ followed by removal of the volatile products at ambient temperature, permitted to shift the following equilibrium:

$$NF_4HF_2 \cdot nHF + XeF_6 \rightleftharpoons NF_4XeF_7 + (n+1)HF$$

quantitatively to the right.

For applications, such as solid propellant $NF_3$-$F_2$ gas generators for chemical HF-DF lasers, the $NF_3$-$F_2$ yields must be as high as possible and no volatile products which would deactivate the excited species can be tolerated. The highest usable fluorine contents theoretically available from the thermal decomposition of a previously known sufficiently stable $NF_4^+$ salt were 64.6 and 59.9 weight percent for $(NF_4)_2NiF_6$ and $(NF_4)_2MnF_6$, respectively. Although these fluorine yields are high, the solid $NiF_2$ and $MnF_3$ byproducts render their formulations difficult to burn and require higher fuel levels thus reducing the practically obtainable fluorine yields. Consequently, $NF_4^+$ salts decomposing exclusively to $NF_3$, $F_2$ and inert diluents, such as noble gases or nitrogen, were highly desirable. The new $NF_4XeF_7$ salt, described in this invention, fulfills all of these requirements and provides a theoretical usable fluorine yield of 62.9 weight percent. On decomposition, it produces only $NF_3$, $F_2$ and inert Xe. A further increase in the usable fluorine yield to 71.7 weight percent, the highest presently known value, was achieved by converting $NF_4XeF_7$ into $(NF_4)_2XeF_8$ according to:

$$2NF_4XeF_7 \rightarrow (NF_4)_2XeF_8 + XeF_6$$

This conversion was achieved by irradiating the yellow $NF_4XeF_7$ salt with blue 4880 Å light from an Ar ion laser. The yellow $NF_4XeF_7$ strongly absorbs the blue light and is photolytically decomposed to $(NF_4)_2XeF_8$ and gaseous $XeF_6$. Since $(NF_4)_2XeF_8$ is white it does not absorb the blue light and is not further decomposed. Therefore, this invention also provides a new, selective, laser-induced, photolytic method for converting $NF_4XeF_7$ into $(NF_4)_2XeF_8$. The latter compound not only provides the highest $NF_3$-$F_2$ yield of any presently known compound, but also gives the highest theoretical detonation pressures in explosive formulations (about 50 kbar higher than corresponding formulation containing $(NF_4)_2NiF_6$).

Accordingly, an object of this invention is to provide a new compound.

Another object of this invention is to provide new energetic $NF_4^+$ compositions which are useful in explosives, and solid propellants.

A further object of this invention is to provide $NF_4^+$ compositions for solid propellant $NF_3$-$F_2$ gas generators for chemical HF-DF lasers which deliver a maximum of $NF_3$ and $F_2$ while not producing any gases which deactivate the chemical laser.

Still another object of this invention is to provide a novel method of preparing new energetic compounds.

These and other objects of this invention will become apparent from the following detailed description.

DETAILED DESCRIPTION OF THE INVENTION

Example 1

Dry CsF (15.54 mmol) and $NF_4SbF_6$ (15.65 mmol) were loaded in the drybox into one half of a prepassivated Teflon U metathesis apparatus. Dry HF (9 ml liquid) was added on the vacuum line and the mixture was stirred with a Teflon-coated magnetic stirring bar for 45 minutes at 25° C. After cooling the apparatus to −78° C., it was inverted and the $NF_4HF_2$ solution was filtered into the other half of the apparatus. Most of the HF solvent was pumped off during warm up from −78° C. towards room temperature until the first signs of $NF_4HF_2$ decomposition became noticeable. At this point the solution was cooled to −196° C. and $XeF_6$ (17.87 mmol) was added. The mixture was warmed to 25° C. and stirred for 12 hours. Although most of the $XeF_6$ dissolved in the liquid phase, there was some evidence for undissolved $XeF_6$. Material volatile at 25° C. was removed in a static vacuum and separated by fractional condensation through traps kept at −64° and −196° C. Immediately, a white copius precipitate formed in the reactor, but disappeared after about 10 minutes resulting in a clear colorless solution. As soon as the first signs of $NF_4HF_2$ decomposition were noted, removal of volatiles was stopped and the reactor cooled to −196° C. The HF collected in the −196° C. trap was discarded, but the $XeF_6$ collected in the −64° C. trap was recycled into the reactor resulting in a yellow solution at room temperature. This mixture was stirred at 25° C. for several hours, followed by removal of the material volatile at 25° C. in a dynamic vacuum. The volatiles were separated by fractional condensation through traps kept at −210°, −126° and −64° C. and consisted of $NF_3$ (∼0.3 mmol), HF (∼11 mmol), and $XeF_6$, respectively. The reactor was taken to the drybox and the solid products were weighed. A yellow filtrate residue (5.149 g, weight calcd for 15.54 mmol $NF_4XeF_7$=5.506 g, corresponding to a yield of 93.5 percent) consisted of $NF_4XeF_7$, and the white filter cake (5.78 g, weight calcd for 15.54 mmol of $CsSbF_6$=5.72 g) consisted of $CsSbF_6$. The composition of these solids was confirmed by vibrational and $^{19}F$ NMR spectroscopy, pyrolysis and analysis of the pyrolysis residue for $NF_4^+$, $Cs^+$ and $SbF_6^-$. Based on thes results, the reaction product had the following composition (weight %): $NF_4XeF_7$ (98.01), $NF_4SbF_6$ (0.88) and $CsSbF_6$ (1.11).

The $NF_4XeF_7$ salt was identified by its Raman spectrum which exhibited the bands characteristics for $NF_4^+$ (1159, 1149, ($\nu_3$), 841, ($\nu_1$), 603 ($\nu_4$), 440 ($\nu_2$) and $XeF_7^-$ (558, 495, 464, 233, 212 cm$^{-1}$).

EXAMPLE 2

A sample of $NF_4XeF_7$ was exposed at room temperature for prolonged time to blue 4880 Å laser light. Photolytic decomposition of $NF_4XeF_7$ occurred resulting in $(NF_4)_2XeF_8$ formation (time of exposure depends upon the intensity and power of the light source)

$$2NF_4XeF_7 \xrightarrow{h\nu(4880\text{Å})} (NF_4)_2XeF_8 + XeF_6$$

The $(NF_4)_2XeF_8$ salt was identified by its Raman spectrum which exhibited the bands characteristic for $NF_4^+$ (1158, 1145, 841, 602, 440 cm$^{-1}$) and $XeF_8^{2-}$ (500, 433, 416, 380, 374 cm$^{-1}$).

Obviously many modifications and variations of the present invention are possible in the light of the above teachings. It is therefore to be understood that within the scope of the appended claims the invention may be practiced otherwise than as specifically described.

We claim:
1. $(NF_4)_2XeF_8$.
2. A method of preparing $(NF_4)_2XeF_8$ comprising the following steps in order:
 (1) exposing $NF_4XeF_7$ to a blue 4880 Å laser light source until photolytic decomposition of $NF_4XeF_7$ occurs resulting in $(NF_4)_2XeF_8$ formation, and
 (2) isolating the product $(NF_4)_2XeF_8$.